United States Patent [19]

Crump

[11] Patent Number: 5,340,433
[45] Date of Patent: * Aug. 23, 1994

[54] MODELING APPARATUS FOR THREE-DIMENSIONAL OBJECTS

[75] Inventor: S. Scott Crump, Minnetonka, Minn.

[73] Assignee: Stratasys, Inc., Minneapolis, Minn.

[*] Notice: The portion of the term of this patent subsequent to Jun. 9, 2009 has been disclaimed.

[21] Appl. No.: 894,248

[22] Filed: Jun. 8, 1992

Related U.S. Application Data

[63] Continuation-in-part of Ser. No. 429,012, Oct. 30, 1989, Pat. No. 5,121,329.

[51] Int. Cl.⁵ .............................................. B65C 11/04
[52] U.S. Cl. ..................................... 156/578; 118/202; 156/218; 156/350; 264/25; 264/239; 425/378.1; 425/379.1
[58] Field of Search ............................ 156/578, 218; 425/378.1, 379.1, 547, 549; 264/25, 239; 118/202, 302

[56] References Cited

U.S. PATENT DOCUMENTS

| | | | |
|---|---|---|---|
| 2,708,278 | 5/1955 | Kamborian | 156/578 |
| 2,726,629 | 12/1955 | Paulsen | 156/578 |
| 2,762,716 | 9/1956 | MacKenzie | 156/578 |
| 2,824,541 | 2/1958 | Paulsen | 156/578 |
| 2,940,888 | 6/1960 | Johnson | 156/218 |
| 2,975,150 | 3/1961 | Johnson et al. | 156/334 |
| 3,313,666 | 4/1967 | Battersby et al. | 156/218 |
| 3,749,149 | 7/1973 | Paton et al. | 164/50 |
| 4,069,087 | 1/1978 | Lüke et al. | 156/578 |
| 4,247,508 | 1/1981 | Housholder | 264/219 |
| 4,621,762 | 11/1986 | Bronowski | 228/215 |
| 4,749,347 | 6/1988 | Valavaara | 425/135 |
| 5,121,329 | 6/1992 | Crump | 264/25 |

FOREIGN PATENT DOCUMENTS 0284674 10/1988 European Pat. Off. .
3904230 8/1990 Fed. Rep. of Germany .
2583333 12/1986 France .

Primary Examiner—David A. Simmons
Assistant Examiner—William J. Matney, Jr.
Attorney, Agent, or Firm—Moore & Hansen

[57] ABSTRACT

Apparatus incorporating a movable dispensing head provided with a supply of material which solidifies at a predetermined temperature, and a base member, which are moved relative to each other along multiple axes in a predetermined pattern to create three-dimensional objects by building up material discharged from the dispensing head onto the base member at a controlled rate. The apparatus is preferably computer driven in a process utilizing computer aided design (CAD) and computer-aided (CAM) software to generate drive signals for controlled movement of the dispensing head and base member as material is being dispensed.

Three-dimensional objects may be produced by depositing repeated layers of solidifying material until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer.

16 Claims, 6 Drawing Sheets

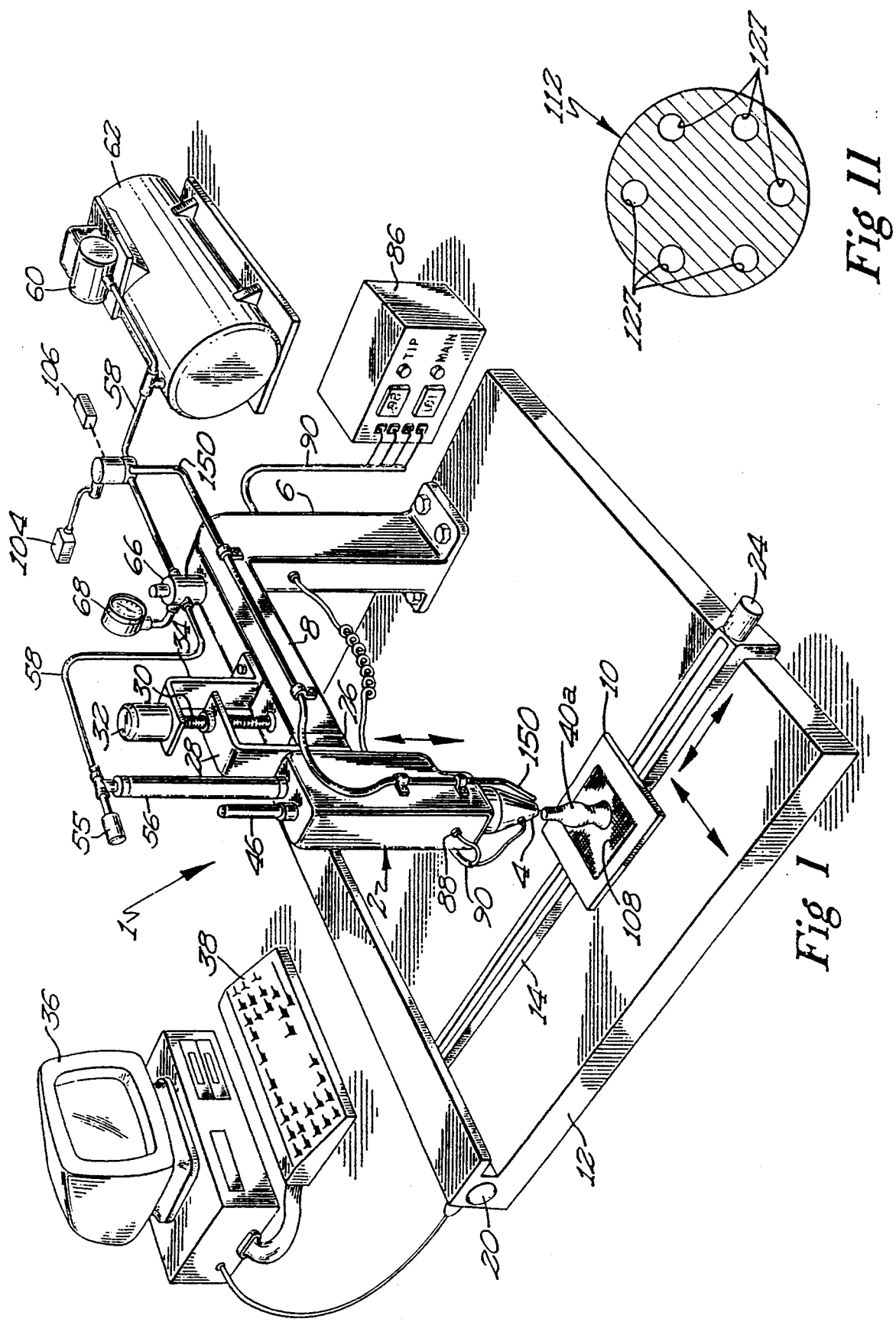

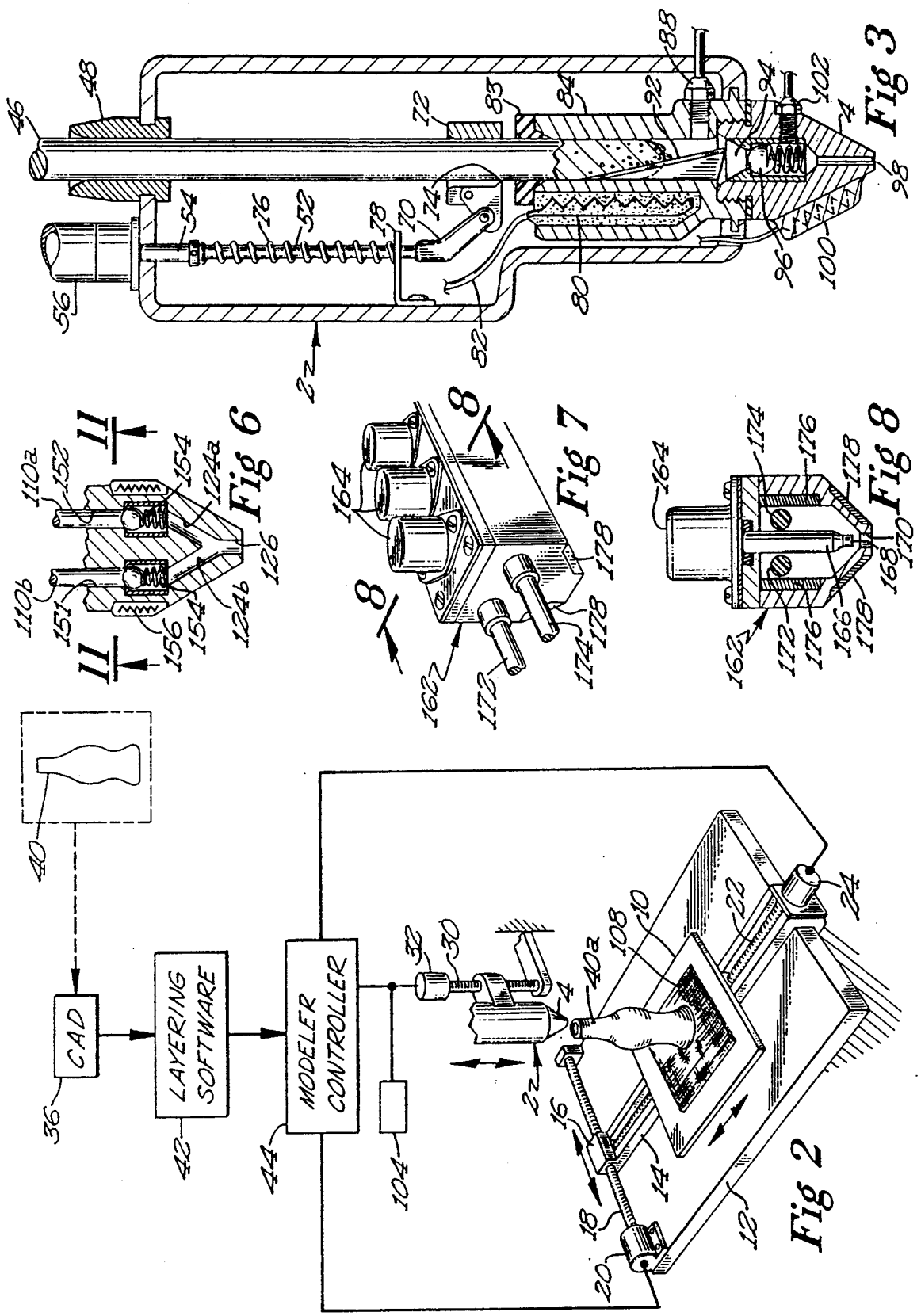

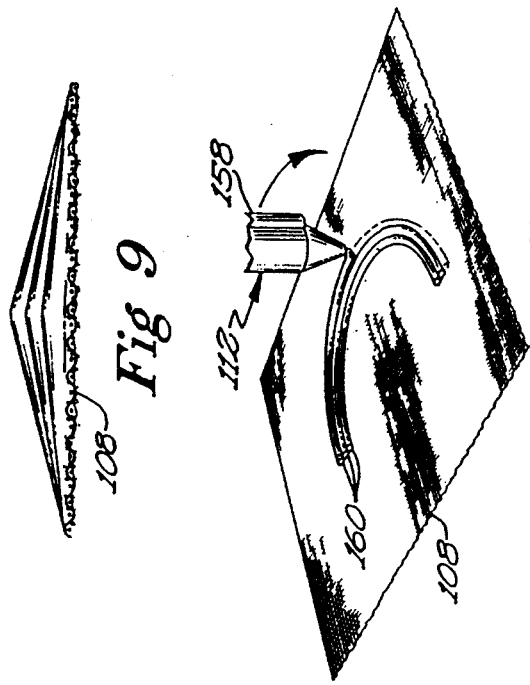
Fig 9
Fig 10
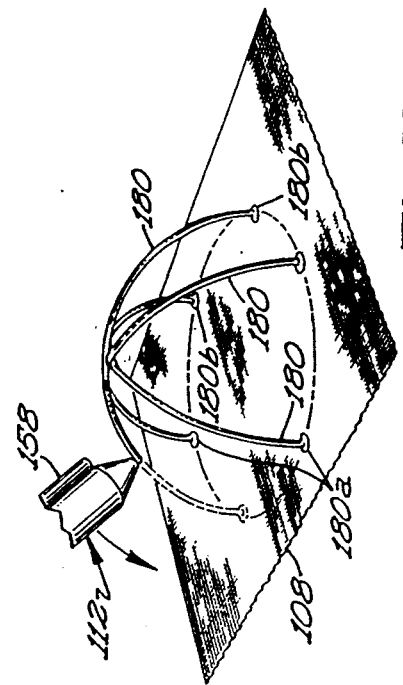
Fig 12
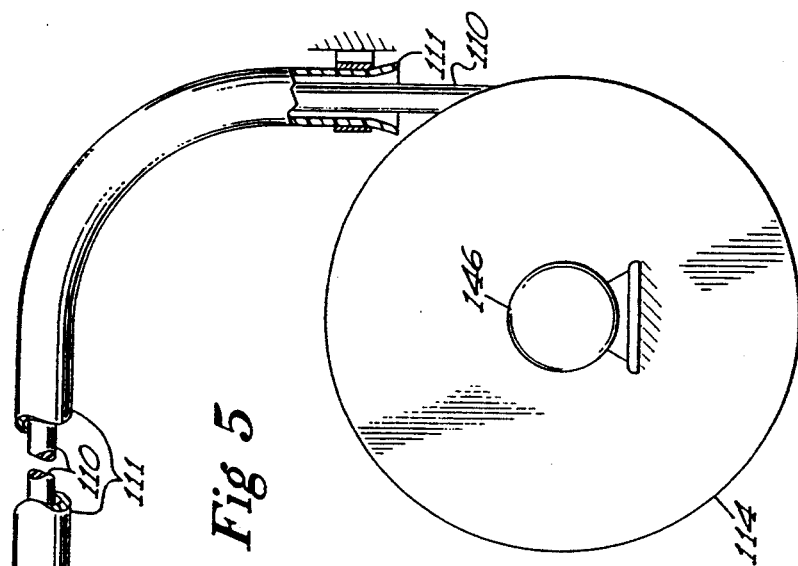
Fig 5
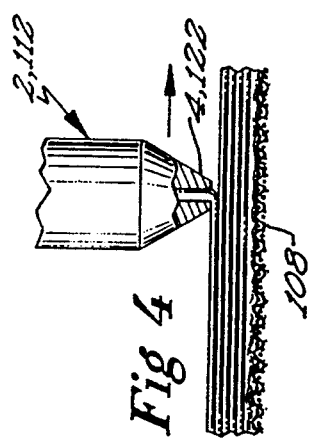
Fig 4

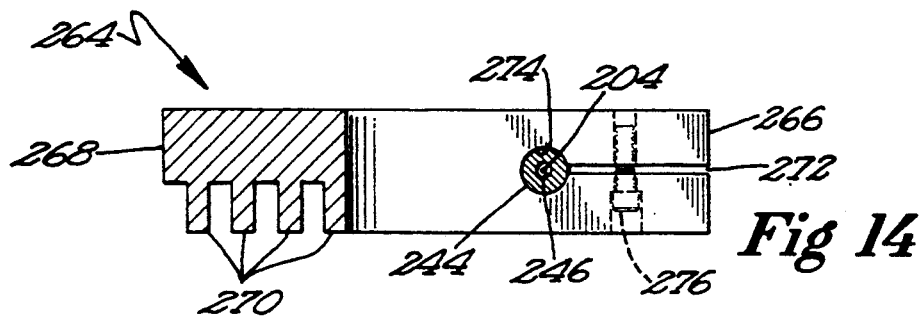
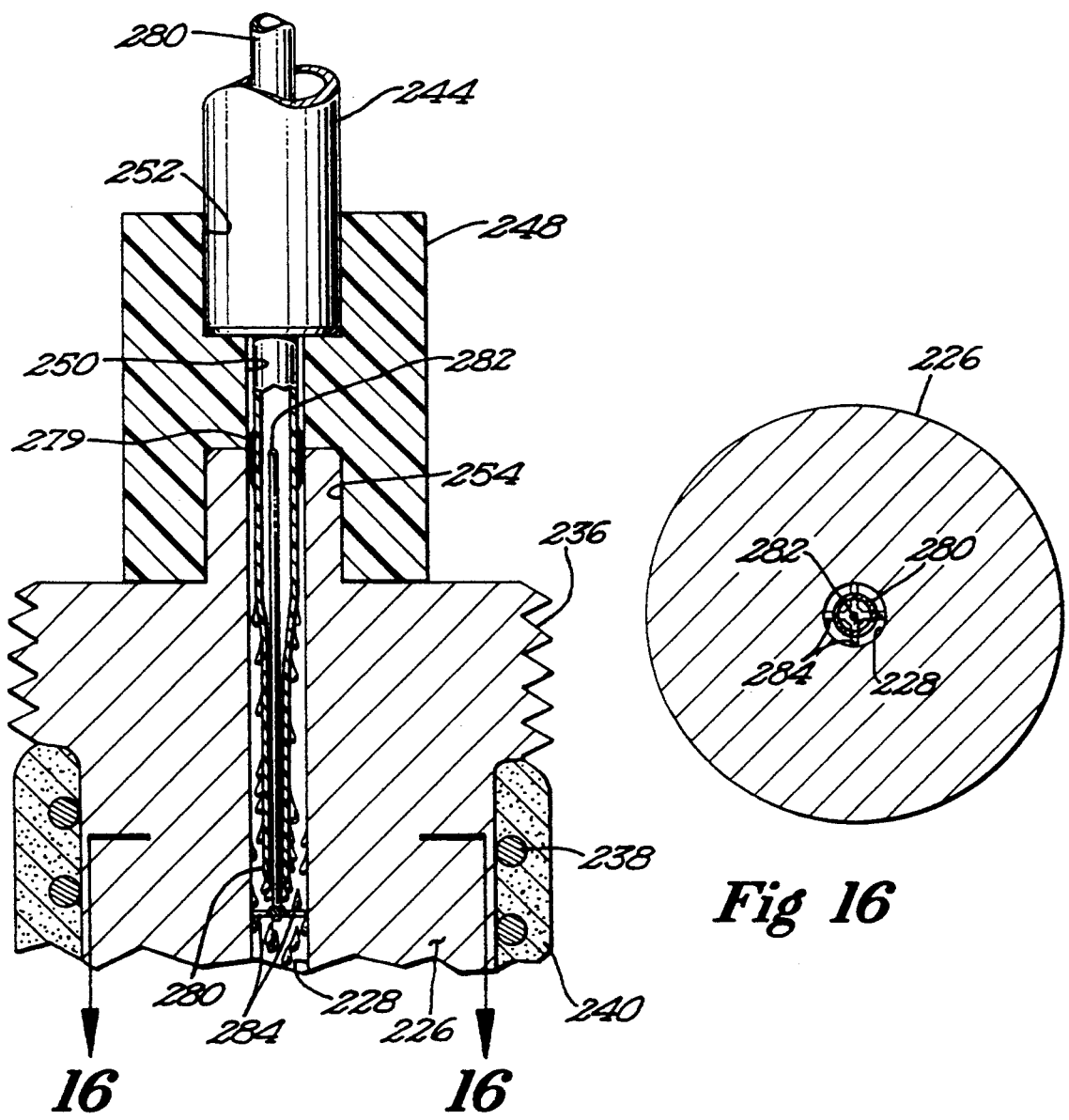

MODELING APPARATUS FOR THREE-DIMENSIONAL OBJECTS

This application is a continuation-in-part of application Ser. No. 07/429012 filed on Oct. 30, 1989, now U.S. Pat. No. 5,121,329 issued on Jun. 9, 1992.

BACKGROUND OF THE INVENTION

This invention relates to an apparatus and process for forming a three-dimensional object of predetermined design, and in particular to the making of a model or article by depositing multiple layers of a material in a fluid state onto a base. The material is selected and its temperature is controlled so that it solidifies substantially instantaneously upon extrusion or dispensing onto a base, with the build-up of the multiple layers forming the desired article.

Methods and techniques for making three-dimensional articles of a predetermined size and shape are known. In accordance with conventional techniques, the desired part is initially drawn, either manually or automatically utilizing a computer-aided design (CAD) procedure, with the article being ultimately formed by removing material from a block work piece to form the desired shape in a machine operation. The machining operation may also be automatic with the utilization of a computer-aided machining (CAM) process. This costly and time consuming process is repeated multiple times to perfect the final manufacturing of a part, model, or prototype. The designer's success is often dependent upon either the interpretation or the skill of the machinist making the prototype or model. This common practice of mechanically removing material to create three-dimensional objects involves significant machining skills and machining time. Chemical machining techniques available to form objects have depth limitations and are incapable of making complex shapes. Thermal molding by injection or other molding techniques requires expensive molds and a procedure better adapted economically for large runs where reproducability is required. With respect to jewelry applications, most custom jewelry is now produced manually.

The current state of the art does embrace processes for making three-dimensional objects by building-up material in a pattern as prescribed by an article to be formed. U.S. Pat. No. 4,665,492 issued to William E. Masters discloses such a process wherein a stream of particles is ejected from a supply head and directed to the coordinates of the three-dimensional article in response to data automatically provided from a CAD system. This process requires a seed at the point of origin of the article to which the particles are initially directed. The particles impinge upon and adhere to each other in a controlled environment so as to build-up the desired article. The Masters procedure requires the use of two injection heads to achieve the desired three-dimensional article, requires a seed at the point of origin about which the article is constructed, and thus does not lend itself to the formation of successive layers of material in a predetermined pattern as a relatively simple means for building-up an article, such as a model or prototype. The Masters system builds up the article from a central seed by applying material to predetermined coordinates. Such a process presents inherent difficulties in holding close tolerances in the 0.001 inch range and without accumulative error build-up.

Processes and apparatus also exist in the prior art for producing three-dimensional objects through the formation of successive, adjacent laminae which correspond to adjacent cross-sectional layers of the object to be formed. However, known techniques of that type in the art of stereolithography require the use of a vat of liquid comprising a photo-curable polymer which changes from a liquid to a solid in the presence of light. A beam of ultraviolet light (UV) is directed to the surface of the liquid by a laser beam which is moved across the liquid surface in a single plane, in a predetermined XY pattern, which may be computer generated by a CAD system. In such a process the successive layers may only be formed in a single, horizontal plane, with successive layers which solidify in the liquid vat adhering together to form the desired object. Such a process and apparatus is disclosed in U.S. Pat. No. 4,575,330 issued to Charles W. Hull.

U.S. Pat. Nos. 4,752,498 and 4,801,477 issued to Fudim disclose more recent methods for the production of three-dimensional objects by irradiation of photopolymers within a liquid medium. Multi-layered objects can be made in accordance with the teachings of those patents by directing photopolymer solidifying radiation directly into a desired area within the uncured photopolymer with the use of an immersed radiation guide. However, here again, such processes require the use and handling of curable photopolymer liquids which are hazardous, and do not permit the forming of ultra-thin layers of material in building up an object with a very fine and smooth surface.

U.S. Pat. No. 4,818,562 issued to Frank G. Arcella et al discloses a method form forming an article by directing a laser beam to a fusible powder which is melted by the beam and solidifies on its surface to form an object of desired shape. This process is also very expensive, and is further complicated by the required use of a gas which is directed through the powder to fluidize it. Impurities in the gas must ultimately be removed, and the gas must be recirculated or vented by the use of complex gas-handling apparatus.

Devices also exist for the manual making of models or sample articles, such as jewelry, from wax by the use of a wax dispensing gun from which the wax is dispensed in a heated, molten state. Such a wax-modeling gun is manufactured by the MATT Company, 663 Fifth Avenue, New York, N.Y. Also, glue guns, such as that manufactured by Parker Manufacturing Company of Northboro, Mass., are available for heating and dispensing adhesives in a fluid, molten state for gluing articles together. The Parker glue gun utilizes a glue stick which is heated within the gun and dispensed as a melted glue. However, neither the wax-molding gun nor the known glue guns have ever been adapted or utilized in conjunction with mechanical means through which the dispensing gun and/or a substrate may be mechanically moved with respect to each other so as to generate a predetermined, three-dimensional shape by applying successive layers of material in a predetermined pattern.

Thus, a need continues to exist for a relatively simply and efficient process and apparatus by means of which designers may design and create three-dimensional objects at office work stations. The process and apparatus disclosed herein meets that need with the same ease and simplicity of using a desk-top computer and printer, with the entire modeling process being carried out at the operator's CAD work station.

BRIEF SUMMARY OF THE INVENTION

This invention has as its primary objective the provision of a process and apparatus by means of which three-dimensional objects can be created at an office work station in a very time and cost effective manner. It is anticipated that the invention will be particularly useful in the making of single prototypes or models of products so that they may be quickly made and studied by designers. Products having complicated shapes may thus be evolved effectively and efficiently through immediate observation of design errors and repeated modeling.

These basic objectives are realized by dispensing a material at a controlled rate from a dispensing head unto a substrate or base member in a predetermined pattern dictated by the shape of an article to be formed, with the material being dispensed in multiple layers which solidify and adhere to each other to build up the article. The process is controlled so that the material in the preceding layer, and in particular at least the material under the dispensing head, has solidified before additional material is applied on top of it to form a subsequent layer.

Advantageously, material is applied in a fluid state in very thin layers which adhere to the preceding layers in a multiple laminate of exceptionally smooth surface quality. The dispensing head is controllably elevated along a "Z" axis so as to sequentially form layers of material as thin as 0.0001 inches or as great at 0.125 inches in thickness. The thickness of each layer is controlled by regulating the gap between the dispensing head and the previously-formed layer. Alternatively, the base member may be movably mounted for controlled up and down elevation along a "Z" axis to control the gap between the dispensing head and the previously formed layer. In that arrangement, the dispensing head would be mounted for movement in an X, Y plane.

In order to mechanically form each successive layer, drive motors are provided to selectively move the base member and dispensing head relative to each other in a predetermined pattern along "X" and "Y" axes as material is being dispensed. Relative vertical movement along a "Z" axis may also be carried out during the formation of each layer, as well as at the completion of each layer to achieve desired layer shape and thickness. Such mechanical movements are preferably achieved through drive signals input to the drive motors for the base member and dispensing head from a computer/controller CAD/CAM system. In such a system the design of an article to be formed is initially created on a computer, with commercially available software being utilized to convert the three-dimensional shape into multiple layer data which is transmitted as drive signals through a computer-aided machine (CAM) controller to the aforesaid drive motors. Each layer can have its own distinctive shape as controlled by the program in the CAD system, and the layers may have different thicknesses.

The article-forming material is preferably supplied to the dispensing head in the form of a flexible strand of solid material from a supply source, such as a reel. A rod of solid material may also be used as the material-supply medium on the dispensing head. In either case, the material is heated above its solidification temperature by a heater on the dispensing head and applied as a fluid. Preferably, the dispensing head includes a flow passage connected to a discharge outlet in a nozzle from which the fluid material is dispensed. The nozzle may advantageously function as a "doctor blade" acting on the surface of each layer as it is formed to closely control the thickness of each layer.

Various material, including waxes, thermoplastic resins, and metals may be used to form three-dimensional articles as described herein. The material is preferably one which will melt at a preselected temperature and rapidly solidify without shrink distortion upon adhering to the previous layer. A temperature controller responsive to temperature sensors on the dispensing head is used to closely control the temperature of the supply material to a level of about 1° C. above its solidification temperature at the point of discharge. This ensures consistent flow and that the material will solidify substantially instantly upon cooling, after discharge, with resultant efficiency in the article-forming process as multiple layers are discharged, solidify, and build-up. A supplemental heater on the nozzle tip responsive to the temperature controller provides the close control of the temperature of the material as it is discharged, to ensure that it is in a fluid state slightly above its solidification temperature.

Advantageously, at least one pair of pulleys or rollers having a nip in between are utilized as a material advance mechanism to grip a flexible strand of modeling material and advance it into a heated dispensing or liquefier head having an elongated material passage extending therethrough to a discharge orifice at the opposite end of the head. A thermal seal is provided on the material receiving end of the dispensing head to ensure that the continuous, flexible strand does not rise to a temperature such that it becomes unduly limp so as to fold or buckle upon being advanced by the supply rollers, with resulting plugging of the relatively small diameter, material passage extending through the liquefier or dispensing head. This objective is further enhanced by providing a tubular guide member having an elongated material passage extending therethrough in alignment with an aperture in the thermal seal and with the material passage through the dispensing head, between the output side of the supply rollers and the aperture through the thermal seal. The tubular guide member is made of highly conductive metal, such as aluminum or silver. It thus dissipates heat rapidly to maintain the flexible strand at a suitable temperature during its movement from the supply rollers into the material passage in the dispensing head so that the strand will not become limp and buckle.

As a further beneficial aspect of the modeling machine, one embodiment may utilize modeling material in the form of a flexible strand having a hollow or tubular configuration. A heat conducting mandrel is supported in heat conductive relation to the liquefier head within its material flow passage, and the tubular strand is advanced over the mandrel. Thus, the flexible strand is heated more thoroughly and rapidly on both its inside and outside surfaces.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 is a perspective view showing one version of the apparatus for forming three-dimensional objects;

FIG. 2 is a diagrammatic view showing the computer-aided design system for operating the article-forming apparatus;

FIG. 3 is a vertical section view of the dispensing head of FIG. 1;

FIG. 4 is a fragmentary view showing the dispensing head applying multiple layers of material;

FIG. 5 is an elevation view of a different embodiment of the material-applying apparatus utilizing a flexible strand as the supply material;

FIG. 6 is a fragmentary, section view of a modified forth of dispensing nozzle showing multiple flow passages;

FIG. 7 is a fragmentary, perspective view of a manifold type of material dispenser having multiple outlets;

FIG. 8 is a vertical section view of the manifold and valve assembly of FIG. 7;

FIG. 9 is a diagrammatic illustration showing how multiple layers of material can be built up in varying heights and thicknesses; and FIG. 10 is a diagrammatic illustration showing how material can be dispensed and formed in free space by the apparatus of this invention.

FIG. 11 is a bottom plan view of an alternative multiple orifice dispensing head as viewed along lines 11—11 of FIG. 6;

FIG. 12 is a diagrammatic illustration showing how a wire frame article can be formed by the apparatus of this invention;

FIG. 14 is a fragmentary, top, plan view of the heat dissipating fin and tubular guide member for the strand, taken along lines 14—14 of FIG. 13;

FIG. 15 is a fragmentary, vertical section view of a modified embodiment of the dispensing head utilizing a tubular strand as the supply material in combination with a heating mandrel for heating the inside of the strand;

FIG. 16 is a horizontal section view of the apparatus of FIG. taken along lines 16—16 thereof.

DESCRIPTION OF THE PREFERRED EMBODIMENTS

Figure 13:
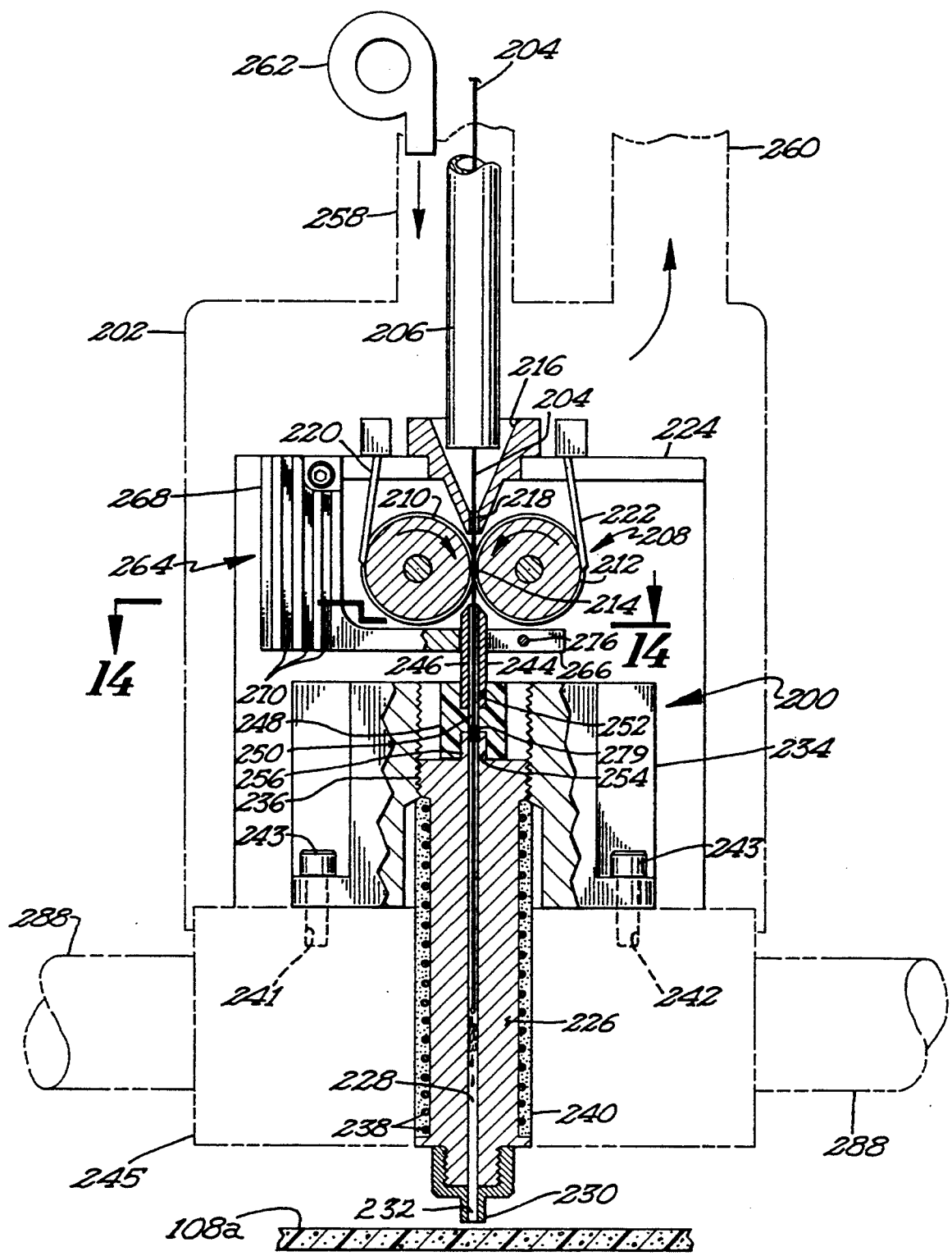
FIG. 13 is an elevation view, partially in section, of still another embodiment of the material-applying apparatus utilizing a flexible strand as the supply material.

Referring now to the drawings, FIG. 1 illustrates one embodiment of the apparatus of this invention for making three-dimensional articles, the apparatus being generally indicated by reference numeral 1. The apparatus includes a movable dispensing head 2 having a discharge nozzle 4 at its bottom end, dispensing head 2 being supported from a pedestal 6 by a mounting arm 8. Dispensing head 2 is located in close proximity to a base member comprising a plate 10 on which an article to be formed is built up as hereinafter set forth.

Dispensing head 2 and base plate 10 are supported for mechanical movement relative to each other. In the preferred embodiment shown, this is accomplished by providing mechanical means for translational movement of base plate 10 laterally along "X" and "Y" axes of a base plane and for vertical movement of dispensing head 2 along a "Z" axis. Accordingly, as is shown in FIGS. 1 and 2, base plate 10 is supported on an X-Y axis table 12 having a slide rod 14 in threaded engagement within its drive block 16 with a drive screw 18. A drive motor 20 provides rotary power to drive screw 18. Slide rod 14 also carries an elongated drive screw 22 driven by a second motor 24 and coupled to mating threads (not shown) secured to the underside of base plate 10 for driving engagement therewith. It will thus be seen that article-receiving base plate 10 may be moved along the X and Y axes indicated in FIG. 1 by the selected actuation of motors 24 and 20, respectively.

Separate mechanical drive means are provided for up and down vertical movement of dispensing head 2. For that purposed, head 2 is mounted for vertical movement on a micro-slide bearing 26 on one end of support arm 8 by a bracket 28. One apertured end of right angle bracket 28 is threadedly engaged with a drive screw 30. A third drive motor 32 supplies driving, rotary power to screw 30 and is mounted on support arm 8 by bracket 34 as shown. Selected actuation of reversible motor 32 thus rotates screw 30 to provide up and down vertical movement of dispensing head 2 on slide bearing 26. For that purpose, motor 32 is preferably a high resolution stepper motor. It is to be noted, however, that various types of motors could be used for drive motors 20, 24, and 32, including stepper motors, linear motors, servomotors, synchronous motors, D.C. motors, and fluid motors.

Preferably, for fully-automated operation, motors 20, 24, and 32 are computer-controlled by drive signals generated from a computer 36, by means of which a computer-aided design (CAD) can be created at a design person's work station. Support table 12 on which base plate 10 is carried is of such a size that it can be located on a desk top. Thus, by operation of the computer keyboard 38 as shown in FIG. 1, a three-dimensional article can be designed and created at a single office work station by one operator, in the manner hereinafter set forth. As is indicated schematically in FIG. 2, the design of a three-dimensional article 40 is input to computer 36 utilizing commercially available CAD software. The article design is sectioned into multiple layers by a commercially available software program to provide multiple-layer data corresponding to the particular shape of each separate layer. Such software programs are in commercial use for computer-aided machining (CAM) purposes, and include NC Polaris, Smartcam, and Mastercam. AUTOLISP, has been successfully used to layer AUTOCAD drawings into multiple layers or sections of specific patterns and dimensions. The layering data signals are directed to a machine controller 44 from the layering software 42 as shown diagrammatically in FIG. 2. Controller 44 in turn is connected to the X, Y, and Z drive motors 24, 20, and 32, respectively, for selective actuation of those motors by the transmission of the layering drive signals.

Various materials in different forms may be used for making three-dimensional articles with the apparatus described herein. It is preferred that the material be one which is thermally solidifiable from a fluid state in which it is applied, either at room temperature or at a predetermined temperature by the use of a cooling medium. FIGS. 1 and 3 illustrate one embodiment in which the working material is supplied in the form of a solid rod 46, heated to its melting point in dispensing head 2 and dispensed from nozzle 4 as a flowable fluid.

Various material may be used for the rod, including bees wax, casting wax, machineable and industrial waxes, paraffin, a variety of thermoplastic resins, metals, and metal alloys. Suitable metals include silver, gold, platinum, nickel, alloys of those metals, aluminum, copper, gold, lead, magnesium, steel, titanium, pewter, manganese bronze. Glass, and particularly Corning glass, would also be satisfactory. Materials of varying degree of transparency would be useful in forming certain objects, such as for forming windows in model buildings. Chemical setting materials, including two-part epoxies would also be suitable. Materials which have been found to be particularly suitable for making three-dimensional objects with the apparatus disclosed herein include Freeman "machineable wax" manufactured by Freeman Manufacturing and Supply of Cleveland, Ohio, "Friendly Plastic" thermoplastic manufactured by Friendly Plastic of Boulder, Colo., bismuth 153 alloy manufactured by Metal Specialties of Fairfield, Conn., and Thermoplastic Polymer No. 235-10, Specification No. 11061 sold by Ad-Tech of Hampton, N.H.

Supply rod 46 is inserted into supply chamber 50 of dispensing head 2 through a guide sleeve 48 as is best shown in FIG. 3. Various means may be utilized for advancing supply rod 46 through supply chamber 50 as material from the rod is dispensed through nozzle 4. One suitable means which has proven to be suitable for that purpose comprises a drive rod 52 which is attached as an extension to reciprocating piston 54 of a power cylinder 56. Cylinder 56 is a fluid cylinder which is preferably actuated by a supply of pressurized air through air line 58 from air compressor 60 and its receiver tank 62 in which a reservoir of compressed air is maintained. Air from the compressor/receiver 60/62 is delivered through supply line 58 and a 3-way solenoid valve 64 and a pressure-regulating valve 66 to air cylinder 56. A pressure gauge 68 is connected to the air pressure regulator 66, all as shown in FIG. 1.

Drive rod 52 is connected by a pivotal link 70 to a ratchet head 72 having one or more ratchet teeth 74 which engage supply rod 46 to advance it downwardly within supply chamber 50 of dispensing head 2 towards dispensing nozzle 4. For that purpose, a predetermined air pressure, preferably at a constant level, is maintained on top of piston 54 within cylinder 56 so as to move drive rod 52 downwardly. It will be understood that as rod 52 is moved downwardly, ratchet teeth 74 on ratchet head 72 will advance supply rod 46 downwardly within chamber 50. Drive rod 52 extends through an apertured bracket plate 78 within supply chamber 50, bracket plate 78 serving as a stop for a return spring 76 acting on the bottom of piston 54.

Supply rod 46 is heated within heating head 84 to a predetermined temperature at which it will exceed its solidification temperature and melt to a flowable, fluid form. For that purpose, a main or primary cartridge type, electric resistance heater 80 is provided within heating head 84 within supply chamber 50 of dispensing head 2. A suitable seal ring 83 is provided around the top of heating head 84. An electrical power lead 82 is connected to resistance heater 80 as shown in FIG. 3. Heater 80 is closely controlled in order to heat the solid material of supply rod 46 to a temperature slightly above its melting point, and preferably on the order of 1° C. above the melting point of the rod material. This is accomplished by the use of an electronic temperature controller 86 connected by an electrical lead or conduit 90 to a first thermocouple-sensing element 88 as shown in FIGS. 1 and 3. Thermocouple 88 is located as shown in close proximity to the supply rod 46 within heating head 84 so as to be able to sense the temperature to which the supply material is being heated. Temperature controller 86 has a main, adjustable controller as indicated in FIG. 1 which is set to a predetermined temperature to which the supply rod material is heated by resistance heater 80, in response to sensing signals received from thermocouple 88.

A heater blade 92 forming a part of the heating assembly is embedded in the supply-rod material as shown in FIG. 3 and serves to directly heat it to the predetermined temperature. At its lower end, supply chamber 50 communicates with a flow passage indicated by reference numeral 94 and extending through discharge nozzle 4 to a dispensing outlet in the form of an orifice 98 of predetermined size at the bottom end of nozzle 4. A spring-loaded ball check valve 96 is located within flow passage 94, and opens to assist in metering the outlet flow of fluid material in response to the pressure maintained on the supply rod 46 within supply chamber 50. Check valve 94 also eliminates leakage from nozzle 4 when the system is stopped, even temporarily. Supply material from rod reduced to a liquid state by heater 80 upstream of flow passage 94, flows downwardly into said flow passage and into dispensing outlet 98 from which it may be discharged onto base plate 10 to form layers of material in the course of building up an article.

The size of dispensing outlet 98 may be varied for the particular application, as by using interchangeable orifice inserts in the tip of nozzle 4. Also a variable size orifice of the type employed in cameras for varying the aperture could be utilized.

It is desired to discharge the supply material in a fluid state at a temperature only very slightly above its solidification point, so that the material will solidify very rapidly upon cooling after discharge onto base plate 10. To ensure that the supply material is discharged from outlet 98 at the desired, predetermined temperature and that the material is maintained in a livid state throughout flow passage 94, and does not solidify therein, a supplemental electric heater 100 is provided on the tip of discharge nozzle 4 adjacent to fluid passage 94. Temperature controller 86 has a second, adjustable temperature regulator for the tip heater 100 as indicated in FIG. 1. That temperature regulator receives control signals from a second sensing device in the form of a thermocouple 102 attached to nozzle 4 in close proximity to flow passage 94 near its outlet end. As is also indicated in FIG. 1, the electrical connectors for thermocouples 88 and 102 both extend through power lead or conduit 90 connected to the temperature regulators for the main heater 80 and for tip heater 100 on temperature controller 86.

As drive rod 52 moves downwardly towards the end of its rod supply stroke to bring ratchet head 72 near the position shown in FIG. 3, the piston 54 and drive rod 52 must be retracted upwardly in order that ratchet head 72 with its teeth 74 may take a new grip along supply rod 46 near its upper end. The upward and downward movement of drive rod 52 may be controlled by a limit switch within dispensing head supply chamber 50, which is activated by the downward movement of ratchet head 72 or pivotal link 70; alternatively, a timer 106 as shown schematically in FIG. 1 may be utilized to time the downward movement of supply rod 46 and to initiate the return of drive rod 52 at the expiration of a predetermined time interval. Either type of control device would be connected to air valve 64 so as to de-energize that solenoid valve and cut off the supply of pressurized air to the top of drive cylinder 56. When that happens, return spring 76 urges piston rod 54 back upwardly. That movement is further assisted and permitted by the use of a quick release, vent valve 55 connected to the fitting on the top of air cylinder 56 as shown in FIG. 1. When the supply of pressurized air through line 58 to air cylinder 56 is cut off by the closing of valve 64, the upward movement of piston 54 under the action of return spring 76 expels the air in the top of cylinder 56 through valve 55. At the top of the return stroke of drive rod 52, ratchet head 72 takes a new grip on supply rod 46. Air valve 64 is then reopened at a timed interval by timer 106 to again introduce a supply of pressurized air on top of drive piston 54 within cylinder 56. The downward, supply movement of rod 46 is then reactivated. As supply rod 46 moves downwardly within chamber 50, it is heated within heating head 84 to its melting point. As a result, liquid material flows downwardly into flow passage 94 and out through dispensing outlet 98.

The opening and closing of air valve 64 to regulate the supply of pressurized air, and thus the supply of material in a fluid state through dispensing head 2 and its dispensing outlet 98 may also be accomplished by means of a relay 104 shown schematically in FIGS. 1 and 2. As is indicated in FIG. 2, relay 104 is responsive to the software layering signals directed to the drive motor 32 which provides vertical movement of dispensing head 2 along a "Z" axis. Relay 104 may thus be energized and de-energized to open and close air valve 64 in response to programmed signals indicative of upward and downward movement of dispensing head 2. As hereinafter set forth, it may be desirable when building certain types of articles to close air valve 64 and cut off the supply of material 46 when dispensing head 2 is moved upwardly to commence the formation of sequential layers a predetermined vertical distance above each previously formed layer. When the supply of pressurized air to cylinder 56 is shut off, spring-loaded check valve 96 closes flow passage 94.

With the above-described embodiment, utilizing a solid rod 46 as the source of supply material for forming an article, the metering of the material onto base plate 10 at a predetermined rate is accomplished by a combination of the preselected size of dispensing outlet orifice 98 as well as by the preselected, constant pressure maintained on piston 54 so as to control the rate at which supply rod 46 slowly advances through supply chamber 50 of dispensing head 2 as it is heated and reduced to a liquid state. The metered flow of material is also controlled by the gap or vertical height of the tip of nozzle 4 above the last layer and by the material viscosity.

Various substrates may be utilized to receive an article being formed on top of base plate 10. Relatively fine, wire mesh sandpaper 108 as shown in FIGS. 1 and 2, has been found to be particularly satisfactory for that purpose. After an article 40a is formed on the sandpaper 108, corresponding to a master article 40 to be copied as shown in FIG. 2, the sandpaper substrate or foundation may be readily peeled off of the bottom of the article without damage.

As noted above, the substrate or foundation 108 may advantageously take the form of a fine wire-mesh screen coated with sand and thus comprising an abrasive cloth, such as Norton No. 47650-4. Such "sandpaper" or abrasive cloth can be applied to base plate 10 by double-faced adhesive tape. The substrate 108 is important in avoiding localized shrinkage in the foundation layer of the article being formed and in enhancing release of the article from base plate 110 without damage. The sand particles on the substrate 108 provide particularly effective adhesion of the dispensed material. The material also flows into and imbeds in the cells or pores of the open matrix wire screen. Separation of the article can be facilitated by using a conductive wire mesh screen substrate 108 made of copper wires to which a low voltage current is applied after the article is formed. This heats the screen slightly and frees the article.

Alternatively, the wire mesh screen could be magnetized and iron particles would be mixed into the supply material to enhance adhesion of the foundation layer to the substrate 108. Interruption of a magnetic field applied to base plate 10 would permit separation of the formed article.

The substrate 108 could also be made of water-soluble wax, which could be dissolved to separate the article without damage.

FIG. 5 illustrates another version of the apparatus for dispensing supply material unto the movable base plate 10 in order to form a three-dimensional object by building up multiple layers. In this embodiment, the supply material is in the form of a flexible strand in solid form. The flexible strand, like the solid rod 46 of the embodiment of FIG. 3, is a solid material which can be heated relatively rapidly above its solidification temperature, and which will very quickly solidify upon a small drop in temperature after being dispensed onto the receiving plate 10. Any of the materials described above with respect to the embodiment of FIGS. 1 and 3 would be satisfactory. A flexible strand of thermoplastic resin, wax, or metal in the form of a flexible wire, such as a strand of bismuth, gold or silver, would be suitable. The flexible strand 110 is advanced into and through a dispensing head 112 from a supply reel 114. It is fed through a guide sleeve 111 made of a suitable low friction material such as Teflon for support in motion. Dispensing head 112 has a supply chamber 118 with an inlet aperture 116 at its upper end, and a lower guide aperture 120 through which the flexible strand is fed towards discharge nozzle 122. Discharge nozzle 122 has a threaded connection as shown to dispensing head 112 and contains a central, material supply and flow passage 124 in flow communication at its lower end with a dispensing outlet orifice 126 of predetermined size to assist in providing a metered supply of material in a fluid state. A heater 128 in the form of a sleeve containing an electric resistance heater coil 130 is positioned around discharge nozzle 122 as shown closely adjacent to the walls of nozzle 122 for heating the supply strand in passage 124. A seal ring 132 is provided around the internal surface of flow passage 124 at the inlet to discharge nozzle 122 to provide an hydraulic seal at that location.

In order to introduce the flexible strand of supply material into and through dispensing head 112, a plurality of drive rollers 134 are provided within supply chamber 118 as shown, those rollers being drivingly connected to each other as by suitable belt or chain drives 143. Rotational power is supplied to the drive rollers by a motor 142 and a drive belt or chain 144. Motor 142 may take various forms. A high resolution stepper motor is preferred. A plurality of idler rollers 136 disposed opposite drive rollers 134 cooperate therewith to grip the flexible strand 110 therebetween and to advance it through dispensing head 112 towards the dispensing outlet 126 of nozzle 122. Rollers 136 are spring biased towards rollers 134 to maintain gripping, frictional contact on flexible strand 110 by the use of springs 140 acting on a pressure plate 138, which engages rollers 136.

Supply reel 114 for the flexible strand may be freewheeling, in which case drive motor 142 is the only driving, power source for advancing flexible strand 110. In such an arrangement, motor 142 would preferably be a stepper motor. Alternatively, an additional drive motor 146 could be provided on rotary wheel 114, with motor 146 being a stepper motor to assist in controlling the advance of the flexible strand 110. With two drive motors 142 and 146 being utilized, their speeds would be closely coordinated and controlled so that they advance flexible strand 110 at the same linear rate. With either drive arrangement, sufficient slack is maintained in flexible strand 110 to permit unrestrained travel of dispensing head 112 as an article is being formed.

Flexible strand 110 is preferably of a very small diameter, on the order of 1/16th inch; however, fine, flexible wires of supply material as small as 0.001 inch in diameter may be utilized for controlled advancing through dispensing head 112. By selective control of the drive motor 142 or motor 142 in combination with motor 146, the rate of advance of flexible strand 110, and thus of the volumetric dispensing rate of the supply material onto base plate 10 can be very closely controlled. The flexible strand heated to a predetermined temperature slightly above it solidification point by heater coil 130, within passage 124 nozzle 122. The material is reduced to a fluid state in which it flows outwardly from dispensing outlet 126 onto the sandpaper-receiving surface 108 of base plate 10 as shown in FIG. 1. It is to be noted that the material-supply apparatus of FIG. 5 could be utilized with the same X-Y table 12 and mechanically movable base plate 10 as shown and described with respect to FIGS. 1 and 2. Dispensing head 112, like dispensing head 2, would be mounted on a support arm 8 for selective vertical movement along a "Z" axis a control motor 32. In like manner, a CAD design system utilizing computer 36 and related software for sectioning a design article into multiple layers as shown and described with respect to FIGS. 1 and 2, would be utilized with the dispensing embodiment of 5.

FIGS. 13–15 illustrate still another embodiment of the apparatus for dispensing supply material onto a moveable base plate in order to form a three-dimensional object by building up multiple layers. This embodiment is similar to that of FIG. 5 in that the material is supplied in the form of a flexible, continuous strand, as a solid. The strand or filament is selected from a material which can be heated relatively rapidly above its solidification temperature, and which will very quickly solidify upon a small drop in temperature after being dispensed onto the receiving plate or base member 10. Any of the material described above with respect to the embodiments of FIGS. 1, 3, and 5 would be satisfactory. Additionally, it is contemplated that thermal setting resins, as well as thermoplastic resins may be utilized. Also, modeling could be accomplished by the use of foaming polymers, such as styrofoam, extruded and supplied in filament form. Tempered glass supplied as a flexible strand or as a rod could also be utilized as the modeling material.

A flexible strand or continuous filament 204 is conveyed into a dispensing head 200 in an arrangement similar to that disclosed with respect to FIG. 5. Strand 204 would be advanced into and through dispensing head 200 from a supply reel such as illustrated at 114 in FIG. 5. A guide sleeve 206 made of low friction material, such as Teflon, contains and guides the strand 204, and would extend to the supply reel in the same manner as shown in FIG. 5. Dispensing head 200 is preferably contained within a moveable or hinged cover 202. This permits conditioning the temperature in and around the head for particular control purposes as hereinafter set forth.

Figure 17:
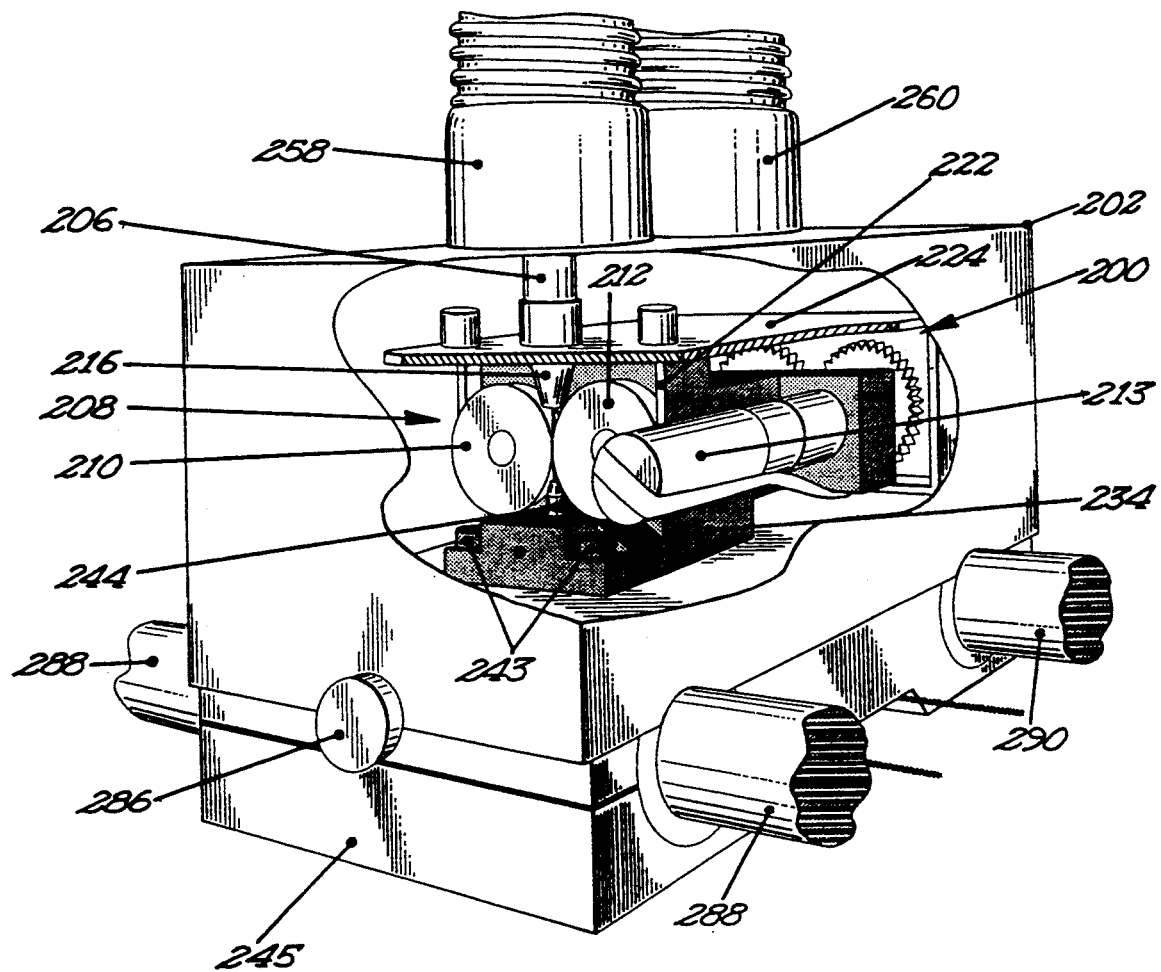
FIG. 17 is a perspective view showing the dispensing head and material advance mechanism of FIG. 13 mounted on a carriage for movement relative to a base member.

The strand 204 may be fed or advanced in various ways to dispensing head 200. A preferred strand advance mechanism 208 comprises a pair of feed rollers or pulleys 210 and 212 driven by a servo motor 213. The motor drive arrangement for the feed rollers is illustrated in FIG. 17. Any type of drive arrangement from motor 113 to the shafts of rollers 210 and 212, such as belts or gears may be utilized. A gear drive is shown in FIG. 17. Referring again to FIG. 13, it will be seen that the rollers 210, 212 rotate towards each other to engage the flexible strand 204 at a roller nip 214 to advance the strand forwardly towards a liquefier nozzle 226. A tapered upper guide 216 is provided at the discharge end of strand guide tube 206, with guide 216 having a restricted guide passage 218 through which the strand is fed into the nip between feed rollers 210 and 212. Wiper arms 220 and 222 supported from an upper mounting plate 224 assist in keeping the rollers or pulleys 210 and 212 clean.

Liquefier nozzle 226 has an elongated, central passage 228 through which the modeling material passes, and within which the strand material is melted or fluidized to a flowable state. For this purpose, a heating element in the form of an electric-resistance coil 238 is provided around the body of liquefier nozzle 226. The nozzle 226 is made of heat-conducting material, such as silver or preferably aluminum. Insulation sleeve 240 is provided around heating coil 238. Material passage 228 of liquefier nozzle 226 communicates at its lower end with a dispensing orifice 232, which, as shown, is formed within a removable tip 230 attached to the bottom end of liquefier nozzle 226 by a threaded connection. In this way, dispensing orifices of different sizes may be selectively utilized for the proper dispensing of the particular supply of material being used and for the type of device being modeled or prototyped.

Liquefier nozzle 226 is secured within a mounting block 234, as by a threaded connection 236. Mounting block 234 is attached to a moveable carriage 245, such as by thumb screws 243 extending into threaded apertures 241 and 242. This mounting arrangement and the assembly of mounting block 234 and carriage 245 is clearly shown in FIG. 17. In this embodiment, the carriage 245 is preferably mounted on guide rods 288 and 290 for translational movement in a horizontal plane along an "X" axis. Movement of the carriage 245 along a "Y" axis is accomplished by securing the opposite ends of carriage rods 288, 290 to threaded blocks for translational movement along a threaded rod by a servo motor, in an arrangement of the type illustrated, at 16, 18, and 20 in FIG. 2. As illustrated in FIG. 17, the dispensing head cover 202 has a cover knob 286 by means of which it may be released for swinging movement to an open position to access to the dispensing head components.

With reference to FIGS. 13 and 14, the dispensing head 200 preferably also includes a lower strand or filament guide comprising a tubular guide member 244. Guide member 244 has an internal passage 246 extending therethrough in alignment with passage 228 in liquefier nozzle 226. Lower guide tube 244 is preferably supported on a special, heat-insulating thermal, hydraulic seal 248. Guide tube 244 is positioned and oriented in such a way that its upper, receiving end is in immediate, close proximity to the nip 214 of feed rollers 210, 212. This arrangement ensures that the flexible strand 204 will be fully supported along its length as it is advanced towards liquefying nozzle 226.

Seal ring 248 is preferably of an H-shape as shown in FIG. 13 so as to permit it to serve as an effective connector and heat insulator between the upper end of liquefier nozzle 226 and guide tube 244. For that purpose, seal ring 248 has opposed upper and lower recesses 252 and 254. The bottom end of guide tube 244 is received in recess 252 in a secure, friction fit therewith. In like manner, an upper, reduced diameter extension 256 on liquefier nozzle 226 is received in a secure, friction fit with lower, seal recess 254. Seal ring 248 has a central aperture 250 therethrough for passage of the flexible strand 204. Material passages 246, 250, and 228 in guide rod 244, seal ring 248, and liquefier nozzle 226, respectively, are in vertical alignment as shown for the passage of the flexible strand 204 therethrough. Those three material passages are of a predetermined size so as to provide an annular clearance space around strand 204. Strand or filament 204 may vary through a considerable size range, with all of the strand guide passages having to be adjusted accordingly. With a strand 204 diameter of 0.050 inches, the internal diameter of strand passages 246, 250 and 228 would be on the order of 0.0540 inches. This arrangement ensures that flexible strand 204 will not be obstructed in its movement through guide tube 244, seal 248, and liquefier nozzle 226.

As noted above, insulator 248 serves as a thermal seal. For that purpose, it is made out of heat-insulating plastic. A material which is found to be particularly suitable is Dupont "Vespel" SP-1. Seal 248 minimizes the transfer of heat from heated liquefier nozzle 226 to lower strand guide tube 244. It has been found that it is particularly beneficial to maintain guide tube 244 at a controlled temperature level so as to control the temperature of flexible strand 204 passing therethrough within passage 246. The temperature inside of dispenser head cover 202 could be on the order of 75° F. Thus, cooling of the flexible strand 204 as it is advanced from nip 214 is important so as to maintain the strand at a sufficiently low temperature that it does not become limp and buckle within the strand passages leading to and through liquefier nozzle 226. Control of the temperature around dispensing head 200 and of guide tube 244 is achieved by providing conditioned air through a flexible conduit 258. A small blower 262 may serve as the source of pressurized, ambient air for air supply conduit 258. Flexible conduit 258 preferably embraces and contains strand guide tube 206 and extends with it to the vicinity of a supply reel. The remote, air-receiving end of air conduit 258 would be exposed to the atmosphere adjacent to the supply reel, in the manner shown with respect to tube 111 in FIG. 5, and blower 262 would be arranged to force air into that remote, receiving end of air conduit 258. In this manner, air is circulated from conduit 258 inside of head cover 202 around the material advance mechanism 208 as well as over the dispensing head, and around guide tube 244. The air is discharged through an exhaust, flexible conduit 260.

To enhance the heat dissipation from and the cooling of lower guide tube 244, which is made of heat conductive metal such as aluminum, an "L"-shaped cooling fin 264 is utilized. Cooling fin 264 is shown in FIGS. 13 and 14. It has a lower leg or segment 266 and an upwardly extending leg or segment 268 grooved or formed to provide a plurality of heat-dissipating fins 270. As may be seen most clearly by reference to FIG. 14, cooling fin 264 is slit to provide a slot 272 extending inwardly from one end thereof, with slot 272 terminating at an aperture 274 extending through segment 266 of fin 264. Aperture 274 is slipped over guide tube 244, and cooling fin 264 is secured in tight, heat-conductive relation therewith by means of a screw 276 engaged through the opposite sides of the slotted end of segment 266 of fin 264.

It will thus be seen that heat is effectively dissipated away from guide tube 244 by the circulation of cooling air thereover, with the heat transfer away from tube 244 being enhanced by the use of heat conductive, cooling fin 264. The extent to which guide tube 244 must be cooled and the temperature at which it must be maintained will of course vary with the particular type of strand or filament material being utilized.

In operation, the strand or filament material is heated within passage 228 of liquefier 226 to the point where it is changed to a fluid state. The material 204, in such a fluid state, flows outwardly through dispensing orifice 230, and is deposited on a substrate 108a in a controlled, layering process as described above with respect to FIGS. 1–5. A liquefier tip heater as described above at 100 with respect to FIG. 3 may also be utilized, in conjunction with appropriate temperature sensors such as shown at 102, 148 to ensure that the strand material is in the necessary fluid state at dispensing orifice 230. The preferred type of material for the base member or substrate 108 for receiving and holding the first layer of modeling material is one with an open, porous structure. A foam plastic material has been found to be particularly suitable for that purpose. In particular, a blue polystyrene material as manufactured by Dow-Corning Corporation under that name, and having a compression strength of 30 psi, has a relatively coarse, porous structure which is especially suitable. Such a substrate or base member is illustrated at 108a in FIG. 13.

The driving movement of strand feed rollers 210, 212 against the strand 204 creates a "pumping" action in which the strand acts as a piston forcing the melted liquid formed from it in the lower end of liquefier nozzle 226 downwardly towards orifice tip 2230 within passage 228. The restricted outlet or orifice 230 causes a back pressure within passage 228, as a result of which some of the melted liquid material 204 is forced back upwardly within passage 228 around the outside of the incoming strand or filament 204, which is still in a solid state in the upper end of liquefier 226. For that reason, seal ring 248 must act as both a thermal barrier and as an hydraulic seal. The latter function is accomplished by the solidification and hardening of some of the liquefied material 204 as it reaches the throat or aperture 250 within seal 248. This happens because of the thermal gradient vertically across seal 248, with the temperature gradually decreasing from the lower end of seal 248 towards the upper end thereof where lower guide tube 244 is received. Liquefier 226 will normally be heated to a temperature on the order of 100° C. The temperature will drop rapidly from the top end of liquefier 226 adjacent reduced diameter extension 256. Thus, the temperature could drop from 99° C. at the bottom of the cross portion of H-shaped seal 248 forming its aperture 250 to a temperature on the order of 46° C. in the middle thereof, to a lower temperature on the order of 30° C. at the top of that portion of seal 248 defining its aperture 250. Because of that temperature gradient, liquefied material 204 backing up within passage 228 around incoming strand or filament 204 will very rapidly cool and solidify to a plug 279 shown in FIGS. 13 and 15. That plug 279 forms an effective hydraulic seal around the incoming strand 204 where it is still in the form of a solid.

Guide tube 244 is maintained at a temperature within a range of about 20°–25° C. This ensures that the strand 204 advancing through passage 246 of guide tube 244 will remain in a solid state for effective movement by feed rollers 210–212 through the passages in guide tube 244, seal 248 and liquefier 226. As noted above, this is accomplished by the circulation of relatively cool, ambient air over guide tube 244, with the cooling of the guide tube being enhanced by its cooling fin 264.

The successful forming of three-dimensional prototypes or models by the apparatus and process described herein is enhanced and controlled by placing the entire dispensing head 200, within its cover 202 inside a controlled environment, together with base member 10 and the X, Y-Z translation table and guide rod assembly for the dispensing head 200 and the base member 10. The controlled environment is established inside a transparent cabinet housing the aforesaid components. Heating means, such as electric heating elements are utilized in conjunction with one or more air circulating fans to circulate air at a controlled temperature through the inside of the cabinet in which the aforesaid operating components of the modeling apparatus are housed. Preferably, the temperature inside the operating cabinet is kept within a range of 40° C. to 60° C. This is done to avoid excessive thermal stress which would otherwise occur in the model being formed if it were allowed to cool too rapidly, as could happen if the model or prototype were being made at normal room temperature of about 20° C. Any of the materials described herein as being suitable for the dispensing apparatus shown and described in the various embodiments, will solidify very quickly upon being cooled even 1° C. below the fluid or liquefaction temperature at which they are dispensed from the dispensing head. For example, a material known as blue machineable wax has a melting point of around 90° C. It is heated from the solid, strand shape at which it is introduced into the feed rollers of FIG. 5 or FIG. 13 to bring it to that liquefaction temperature by the 100° C. temperature maintained on the liquefier nozzle 122 or 226.

FIGS. 15 and 16 illustrate a modified version of the apparatus of FIG. 13 wherein the material is supplied in the form of a continuous, flexible strand or filament. FIG. 15 shows on an enlarged scale a fragmentary, section view of the liquefier 226, seal 248, and guide tube 244. In this embodiment, the strand or filament takes the form of a hollow strand or tubular strand or filament 280. Strand 280 as supplied by means of rollers of the type shown in FIG. 5 or FIG. 13 and fed downwardly through lower, tubular guide member 244. A mandrel 282 is supported inside of passage 228 within liquefier 226. Mandrel 282 is made of highly conductive material, such as silver or aluminum. It is preferably supported in heat conductive relation with the side walls of liquefier 226 defining passage 228 by a plurality of radially extending spokes or ribs 284. Mandrel 282 is thus heated from the walls of liquefier 226, as well as by conduction through support spokes 284. Tubular strand or filament 280 is advanced downwardly over mandrel 282. Thus, as it is so conveyed through liquefier 226, strand 280 is heated on its inside surface by mandrel 282, as well as on its outside surface from the heated walls of liquefier 226 defining passage 228. This particular heating arrangement enhances and accelerates the heating of the flexible strand. It is to be noted that support spokes 284 are located below the bottom end of advancing strand 280 at a location where the strand has been fully fluidized or liquefied by the heating from mandrel 282 and liquefier 226. The liquid form of strand 280 thus flows downwardly between support spokes 284 towards the dispensing orifice at the bottom of the liquefier.

With respect to either the dispensing apparatus of FIGS. 1 and 2, or the flexible strand supply apparatus of FIGS. 5 and 13, the supply material is heated to a fluid state in the dispensing head and metered at a controlled flow rate onto a receiving surface, such as sandpaper 108 positioned on base plate 10. In response to drive signals from the computer 36 and the layering software 42 input through controller 44, the dispensing head 2 and base plate 10 are selectively moved with respect to each other in a predetermined pattern to form an article of desired shape. In the embodiment shown, base plate 10 is movable along "X" and "Y" axes with the dispensing head being movable vertically along a "Z" axis. However, it is to be understood that total, controlled movement to form the article could be achieved by moving either the base plate alone or the dispensing head alone, without moving the other.

Alternatively, as illustrated and described with respect to FIGS. 13 and 17, the base plate may be moved by a control motor in a vertical direction or along a "Z" axis, and the dispensed head moved by control motors along "X" and "Y" axes.

As is indicated in FIG. 4, the supply material is dispensed in a fluid state from the dispensing head 2, 112, or 226 through a dispensing outlet onto substrate 108 to form and build up multiple layers of material. Multiple passes of the dispensing head are made, with each pass taking place in a controlled pattern as dictated by the layering software 42 for multiple cross sections of the article being produced in accordance with design data input to computer 36. The computer and related software programs determine when the dispenser is on and off based on the original design drawing. The machine controller 44 controls the operation of drive motors 20, 24, and 32 along the "X," "Y," and "Z" axes. Each of these motors may be operating separately, or one or more of them may be operating simultaneously, depending upon the shape of the article to be formed. Circular patterns for each layer can be generated by controlled movement along the "X" and "Y" axes of the base plate 10. The dispensing head is initially positioned a predetermined height above base plate 10 or its receiving substrate 108 to form the first layer. The height of each subsequent layer is then closely controlled in order to dispense and form very thin layers. The thinner the layers, the smoother the resulting surface on the article. Layers as thin as 0.0001 inches may be formed. The layers can be formed horizontally, vertically, or in any 360° orientation to the horizontal. Depositing of the material may take place along any of the three axes. The dispensing of material may take place along only the "X"- "Y" plane, until it is advantageous to deposit in the "X"- "Z" plane or the "Z"- "Y" plane. Normally, the dispenser head will be mounted along the "Z" axis generally perpendicular to the receiving or base plate 10, and thus perpendicular to the "X"- "Y" plane of table 12.

When forming and building up multiple layers as shown in FIG. 4, the initial relative movement of base plate 10 and the dispensing head will be in a horizontal plane along the "X"- "Y" axes. The first layer is dispensed and solidifies as it adheres to the substrate, such as sandpaper 108. The first layer may take any shape dictated by the computer program and it solidifies substantially instantly. No material is dispensed onto a previously formed layer, until that portion of the layer under the dispensing head has solidified. The second and each subsequent layer may take slightly different shapes, as dictated by the particular cross section for each layer from the computer program and layering software. In the pattern situation for each layer wherein each layer is formed only in a horizontal "X"- "Y" plane, motor 32 is selectively actuated after each layer is formed to raise the dispensing head incrementally along the "Z" axis a closely controlled, predetermined distance to control the gap between layers, and thus the thickness of each layer. After the dispensing head is thus raised, the next layer is dispensed and formed along a controlled path. In some instances, the dispensing head may be moving in a direction along the "Z" axis as the layer is formed, such as when forming a spiral pattern, and the software program will control the location of the dispensing head at the end of each layer. Thus, when at the start position for the next layer, the dispensing head may have already been raised a distance along the "Z" axis above the corresponding point on the previously-formed layer. In such a situation, the dispensing head may not have to be elevated at all at the commencement of the next layer, or it may be elevated incrementally a very small distance to form the desired gap between layers, and thus the predetermined layer thickness.

Each layer of material is dispensed in a liquid state, solidifies and adheres to the previous layer. This forms a very strong bond between layers. When utilizing a dispenser with a nozzle tip having a flat bottom surface as shown with respect to the nozzles 4 and 122 in FIG. 4, the bottom flat face of the nozzle provides a "doctor blade" effect as the nozzle and sandpaper substrate 108 are moved in an "X"- "Y" plane relative to each other. By surface contact with the layer of material as it is being dispensed, the dispenser tip limits the top of each layer to the precise "Z" axis setting, and thus assists in regulating the thickness of each layer so that no accumulated error along the "Z" axis occurs.

The multiple layers may be of uniform thickness as shown in FIG. 4, or the layers may vary in thickness, as necessary and appropriate for the forming of a particular article. Also, the layers may each vary in thickness across the height of each layer, as shown in FIG. 9. As shown in the FIG. 9 illustration, the layers formed on the sandpaper substrate 108 may vary in height along inclined surfaces, and such surfaces may either be straight or arcuate.

Feeding of the supply material is controlled relative to the "X," "Y," and "Z" movement of the base plate 10 and dispensing head in such a way that the flow of material onto the substrate 108 is not starved or unduly excessive. The main concern is the control of layer thickness, and thus of smoothness of finish. If material spills over on one layer and/or is starved on other layers, the layers will be of irregular thickness with a resulting rough wall surface on the article produced. Supply material control may be accomplished in various ways. One approach utilizes the discharge of fluid material from the nozzle orifice by the advance of a solid rod 46 under a constant, predetermined air pressure as described and illustrated with respect to FIGS. 1 and 3. This provides constant fluid pressure of the supply material at the dispensing outlet orifice 98. The advancing movement of the solid rod 46 would be at a speed initially determined by the relative movement speed of the dispensing head and base plate in the "X"- "Y" plane. In the embodiment of FIG. 5, very accurate control of the volume rate of feeding of the flexible strand 110 can be achieved. This can be done by proportionally regulating the linear speed of the drive motor 142 in relation to the resultant "X"- "Y" speed in the horizontal plane of the dispensing head and base plate relative to each other, as achieved by sensing the driving speed of control motors 20 and 24. Alternatively, the speed of motor 142 can be proportionally regulated in relation to the resultant "X," "Y," "Z" speed by sensing motors 20, 24, and 32. Thus, the volumetric flow rate of the supply material in a fluid state as discharged from dispensing head 112 would be controlled in a proportional relation to the "X"- "Y" speed of the dispensing head and base plate 10 relative to each other. This can be done by sensing the pulse signals driving motors 20 and 24, and sending proportional pulse drive signals to drive motor 142 on dispensing head 112.

The material supply apparatus of FIGS. 5 and 13, using a flexible strand of very small, predetermined diameter, permits very accurate control over the volume flow rate of dispensing of the material. Effective on/off fluid dispensing can be achieved by simply stopping the advancing motors. This might be done, for example, when tracing a pattern which includes corners. To avoid puddling or excessive build-up of the supply material at the corners of a pattern, when there is no relative movement between the dispensing head and the base plate along the "X"- "Y" plane, the interruption of the drive signals to motors 20 and 24 can also be used to provide a stop signal to the drive motor(s) for advancing flexible strand 110.

Alternatively, the "X"- "Y" drive motors 20 and 24 can be driven at a constant speed, without interruption. Such a speed would be selected to correspond to the slowest speed required to form patterns, such as around corners, where a relatively slow output feed of dispensing material would be required. The flexible strand 110 of FIG. 5 would be advanced at a constant linear rate by controlling the strand drive motors to correspond proportionally with such a constant speed movement of a dispensing head and base plate relative to each other in the "X"- "Y" plane. This approach to volume rate control of the supply material simplifies the control operation, but would necessitate a greater length of time for building up the article in desired layers. As noted above, the use of a flexible strand as the supply material in the dispensing head apparatus shown in FIGS. 5 and 13 does permit close control of the dispensing of the supply material in a liquid state. The flexible strand 110 or 204 is of such a small diameter and of resulting small mass, that as it is heated in dispensing head 112 or 226, there is substantially minimal accumulation of supply material in a liquid state at the dispensing outlet 126 or 230. Thus, positive cut-off of the linear advancing movement of strand 110, 204 substantially cuts off liquid material dispensing from the head. The flow of supply material may need to be interrupted in such a manner when displacing the dispensing head and base member vertically a predetermined distance along a "Z" axis after forming each layer, and prior to dispensing material in the next layer. Continued material flow from the dispensing head during such incremental vertical movement along the "Z" axis could result in excessive accumulation of material on the preceding layer at a particular point.

The close control of the temperature to which the flexible strand 110 or 204 is heated in the dispensing head also assists in regulating its flow at a desired outlet temperature. For this purpose, a thermocouple 148 as shown in FIG. 5 may be located in close proximity to the internal passage 124 of nozzle 122, with thermocouple 148 being used in conjunction with a temperature controller 86 as described above with respect to FIG. 1, for the purpose of closely regulating the temperature of electric resistance heating element 130. The same type of thermocouple arrangement may be used in proximity to passage 228 of dispensing head 226 in FIG. 13 to closely regulate heating element 238.

Preferably, the supply material utilized will have a solidification temperature permitting it to solidify substantially instantaneously at room temperature in which it is dispensed. For example, thermoplastic resin deposited in relatively thin layers less than 0.001 inch in thickness solidifies substantially instantaneously upon being dispensed at room temperature. If thicker layers of thermoplastic are to be formed, on the order of 0.020 inch, then a cooling medium, such as air, water, or freon may have to be utilized on or in conjunction with base plate 10 so as to cool the thermoplastic resin rapidly as it is dispensed in order to ensure that it will immediately solidify. Cooling medium application must be controlled. Over cooling can cause shrink distortion. The nature and extent of cooling medium application for the purpose of rapidly solidifying the dispensed material will depend upon the nature of the material used. For example, wax will cool and solidify substantially instantaneously in thin layers. In one working embodiment as shown in FIG. 1, compressed air supplied from compressor 60 and its receiving tank 162 was provided through a separate supply line 150, with its discharge end positioned closely adjacent the tip of discharge nozzle 4, as shown in FIG. 1. The cooling air from line 150 assisted in rapidly solidifying the wax as the multiple layers were formed.

Different structures and arrangements of dispensing heads may be utilized for receiving and dispensing different types and/or different colors of dispensing material from separate sources. For example, as shown in FIG. 6, the dispensing head 112 may have multiple supply chambers 151 and 152 into which different supply materials 110a and 110b may be directed from separate supply sources. The supply materials 110a and 110b could be flexible strands supplied from a reel in the manner described and shown with respect to FIG. 5, or they could be in the form of rods as illustrated at 46 with respect to FIG. 1. In either case, different materials could be supplied and alternately melted by a resistance heater 156 on the dispensing head for flow through check valves 154 into alternate flow passages 124a and 124b. As shown in FIG. 6, both of those passages communicate with a single discharge outlet or orifice 126 on the tip of nozzle 122. Thus, with such an arrangement on the dispensing head, different materials, such as thermoplastic resins and wax could be utilized to form different layers of the same article. Also, the supply materials 110a and 110b could be provided in different colors in order to form alternate or different layers of different colors in the object being created. For example, material 110a could be in the form of a red wax, and material 110b could be in the form of a blue plastic.

As shown in FIG. 11, a plurality of dispensing orifices 127 could also be arranged in a circular pattern on a dispensing head 112. The dispensing head would be of the same basic construction as shown in FIG. 6 with multiple supply passages 151, 152, etc., into which multiple rods or flexible strands of different compositions and colors of materials may be directed. However, the bottom of the dispensing head would terminate at section line 11—11 along which FIG. 11 is viewed. Thus material would be dispensed through separate orifices 127 at the outlet of each check valve 154. Such a discharge head construction would expedite set-up time and also permit discharge of material from any desired number of orifices by selective control of the separate supply materials. The user can draw from particular material and color supplies for purposes of the particular article being made and for different layers within each article. It is contemplated that chemical setting materials, such as two-part epoxy compositions could be applied by using the applicator as described with respect to FIG. 11. The two components would be discharged through separate, aligned orifices 127 so as to mix together.

Also, as illustrated in FIG. 10, it is contemplated that thermally solidifying material could be dispensed into free space so as to be suspended above a base plate or substrate 108 to which it is bonded at selected locations. For this purpose, a dispensing head 112 would have an ultrasonic vibrator or horn 158 secured to its outlet end or dispensing tip as shown. Material would be supplied to the dispensing head 112 as a solid, and heated to a fluid or a liquid state by the use of a heating element such as that disclosed at 130 with respect to FIG. 5. Ultrasonic energy is then applied by means of the electrosonic vibrator 158, and the material is dispensed at a temperature slightly below its ambient solidification temperature, the energy supplied by ultrasonic vibration serving to increase the pressure and keep the material in a fluid state as it is discharged from dispensing outlet 126. Since the material is dispensed at a temperature below its solidification temperature, it will solidify instantaneously upon discharge. This technique can be utilized to form a pattern of material in threads, struts, or strands in free space, above substrate 108 as shown in FIG. 10. Each strand of material would be initially discharged onto the substrate for attachment to it. Thereafter, various patterns of the material could be formed in the free space above the substrate as shown in arcuate form, with the material strands being secured in a cantilevered fashion at their opposite ends to substrate 108. Strands of material 160 formed and solidified in free space in a layered fashion are shown in FIG. 10.

The dispensing tip with an ultrasonic vibrator can also be used to create three-dimensional objects without laminations. For example, wire frame objects comprised of multiple, free-standing strands 180 defining wire frame segments anchored to a substrate 108 at spaced locations 180a and 180b could be formed as shown in FIG. 12. Each strand 180 instantaneously solidifies in space as it is dispensed from nozzle 112, with the nozzle and substrate being moved relative to each other in a predetermined pattern along "X," "Y," and "Z" axes by computer-driven control motors. When forming strands in an arcuate shape as shown in FIG. 12, the nozzle 112 could be canted to an angle from the vertical "Z" axis generally perpendicular to lines tangent to the arc being formed. Thus a wire frame created CAD drawing can be directly translated into a wire frame, three-dimensional object. For the object shown in FIG. 12 the strands are anchored at two points and also to each other where they intersect. Cantilevered strands and objects can also be formed with each strand anchored at only one point on the substrate. Thin strands of material can be solidified as wire frames in free space to create hollow or open articles, including those of a spider web configuration or hollow, single piece spheres.

With respect to the embodiments of FIGS. 10 and 12, the ultrasonic vibrator could alone be the means of fluidizing the material, with no heater being used. Instantaneous solidification of the material, even in free space, can also be accomplished by the use of a coolant such as Freon applied to the material as it is discharged from nozzle 112.

It is also contemplated that the dispensing heads may be connected to outlet manifolds incorporating a plurality of dispensing outlets or orifices. Such a dispensing arrangement would be useful for forming a wide swath in multiple layers in a paint brush type of layering effect. FIGS. 7 and 8 show a multiple orifice discharge manifold 162 which would be suitable for such purposes. Positioned along the length of the manifold 162 are a plurality of solenoid actuators, each having a connected plunger 166 with a bottom tip valve element 168 positioned in close, operating relation to a dispensing outlet or orifice 170. The controllers 164 could be electrically actuated solenoids, or they could be air actuators connected to a supply source of pressurized air, in a manner as is commonly utilized with air actuated valves. Material supply rods or strands 172 and 174 may be introduced lengthwise inside of manifold 164 as illustrated in FIGS. 7 and 8. Main, electric resistance strip heaters disposed lengthwise along the internal wall surfaces of manifold 162 serve to initially heat and liquefy the solid supply materials 172 and 174; and separate strip heaters 178 mounted on the outside surface of the bottom of the manifold adjacent to outlet 170 serve to closely control the temperature of the liquefied material to a level just slightly above its solidification temperature. It will be appreciated that manifold 162 can be moved in a linear path across a receiving substrate so as to apply a wide swath of material for building up a relatively large object.

The multiple-dispensing orifice approach may also be used with the flexible strand supply arrangement of FIG. 5. For that purpose, feed rollers 134, 136 would be elongated along their rotational axes to grip and advance a plurality of flexible strands 110 supplied from a plurality of separate supply reels 114. Each strand would be advanced into a separate nozzle 122.

In addition to the material supply arrangements described above, the material could also be supplied to a dispensing head as a liquid from a liquid storage vessel using a fixed or variable displacement pump. For example, a multiple part, chemically hardening, epoxy compound could be used as the article-forming material, with each of the epoxy components being supplied as a liquid from a separate supply source to a multiple-passage dispensing head.

It is anticipated that various changes and modifications may be made in the construction and operation of the apparatus disclosed herein for forming three-dimensional objects, as well as in the methods disclosed for forming such objects, without departing from the spirit and scope of the invention as set forth in the following claims.

What is claimed is:

1. Apparatus for making three-dimensional physical objects of a predetermined shape by sequentially depositing multiple layers of solidifying material on a base member in a desired pattern, comprising:

a moveable dispensing head having an elongated material passage therein connected to a dispensing outlet at one end thereof, and having an oppositely disposed material receiving end;

a supply of material comprising a continuous flexible strand which solidifies at a predetermined temperature, and a material advance mechanism positioned to advance the strand into the elongated material passage on the head;

a base member disposed in close, working proximity to said dispensing outlet of said dispensing head;

mechanical means for moving said dispensing head and said base member relative to each other in multiple dimensions in a predetermined sequence and pattern;

means for metering the discharge of said material in a fluid state from said dispensing outlet at a predetermined rate onto said base member to form a three-dimensional object as said dispensing head and base member are moved relative to each other;

heating means in heat exchange relation to said dispensing head for heating said strand material to a temperature above its solidification temperature in said material passage wherein said material is in a fluid state; and a heat insulating seal ring positioned on said dispensing head in surrounding, sealing relation to the material receiving end of said material passage, said seal ring having an aperture therethrough in alignment with the material passage in the head, said aperture and said material passage being of a predetermined diameter to provide an annular clearance space around a strand of supply material directed therethrough by the material advance mechanism, whereby the seal ring will be at a lower temperature than the heated head, and fluid supply material flowing into the annual clearance space around the advancing strand of material will cool and solidify within the seal ring annular clearance space to form a fluid seal therein.

2. Apparatus as defined in claim 1 wherein:

said material advance mechanism comprises a pair of power-driven rollers having a nip therebetween within which the continuous flexible strand is gripped and advanced towards said material-receiving end of said elongated material passage in the head.

3. Apparatus as defined in claim 2 wherein:

a tubular guide member having a strand guide passage extending therethrough is positioned between said seal ring and the nip of the strand advance rollers with one end thereof abutting against said seal ring and with said strand guide passage in alignment with the aperture in the seal ring, the opposite end of said tubular guide member being positioned so that the receiving end of the strand guide passage is in close proximity to the nip of the strand advance rollers, the diameter of the strand guide passage in the tubular guide member being of a predetermined size so as to provide an annular clearance space around a strand being advanced therethrough.

4. Apparatus as defined in claim 3 wherein:

said tubular guide member is made of heat-conducting material and is exposed to ambient air for cooling thereof, whereby the continuous, flexible strand is maintained at a relatively cool temperature approximating ambient room temperature within the guide passage of the tubular guide member to avoid buckling of the flexible strand and resultant plugging of any of the aforesaid passages in the head, seal ring, and tubular guide member.

5. Apparatus as defined in claim 4 wherein:

a heat conductive fin is secured to said tubular guide member in heat conductive relation thereto to enhance the transfer of heat away from the tubular guide member and thus the cooling thereof.

6. Apparatus as defined in claim 1 wherein:

a tubular guide member having a strand guide passage extending therethrough is disposed between said material advance mechanism and the seal ring with its guide passage in alignment with the aperture through the seal ring and the material passage in the head; and said seal ring has a generally H-shape defining upper and lower recesses therein, said one end of the tubular guide member being snugly received within the upper recess, and an extension on the upper end of the head being snugly received within the lower recess of the seal ring.

7. Apparatus as defined in claim 6 wherein:

said tubular guide member is made of heat conductive material and is exposed to ambient air in order to conduct heat away from the guide passage therein and thus away from the flexible strand passing therethrough.

8. Apparatus as defined in claim 4 and further including:

air circulating means for directing a stream of conditioning air over the tubular guide member.

9. Apparatus as defined in claim 8 wherein:

said air circulating means is constructed and arranged to direct conditioning air over both the material advance mechanism and the tubular guide member.

10. Apparatus as defined in claim 1 wherein:

said continuous flexible strand is of hollow, tubular shape.

11. Apparatus as defined in claim 8, and further including:

an enclosing cover within which at least the material receiving end of said dispensing head, the material advance mechanism and the tubular guide member are contained, said air circulating means comprising an air supply conduit and an air exhaust conduit connected to said cover in air flow relation therewith, and said air supply conduit being connected at one end thereof remote from said cover to a source of pressurized, conditioning air.

12. Apparatus as defined in claim 11 and further including:

a strand guide tube within which the flexible strand is contained and guided from a source of supply thereof to said material advance mechanism, and said guide tube being contained within the air supply conduit.

13. Apparatus for making three-dimensional physical objects of a predetermined shape by sequentially depositing multiple layers of solidifying material on a base member in a desired pattern, comprising:

a moveable dispensing head having an elongated material passage therein connected to a dispensing outlet at one end thereof, and having an oppositely disposed material receiving end;

a supply of material comprising a continuous flexible strand in the form of a hollow tube which solidifies at a predetermined temperature within 2° C. of its melting point, and a material advance mechanism positioned to advance the strand into the elongated material passage on the head;

a base member disposed in close, working proximity to said dispensing outlet of said dispensing head;

mechanical means for moving said dispensing head and said base member relative to each other in multiple dimensions in a predetermined sequence and pattern;

means for metering the discharge of said material in a fluid state from said dispensing outlet at a predetermined rate onto said base member to form a three-dimensional object as said dispensing head and base member are moved relative to each other;

heating means in heat exchange relation to said dispensing head for heating said strand material to a temperature above its solidification temperature in said material passage wherein said material is in a fluid state.

14. Apparatus as defined in claim 13 wherein:

a heat conductive, elongated mandrel is supported within the elongated material passage of the dispensing head, said mandrel having an outside diameter which is less than the inside diameter of the hollow tube, flexible strand, whereby the hollow tube flexible strand passes over the mandrel in heat transfer relation therewith as the strand is advanced through the elongated material passage within the dispensing head, and the hollow tube flexible strand is heated on both its inside and outside surfaces.

15. Apparatus as defined in claim 14 wherein:

said mandrel is supported within the elongated material passage of the dispensing head by a plurality of heat conducting spokes extending radially within said passage.

16. Apparatus for making three-dimensional physical objects of a predetermined shape by sequentially depositing multiple layers of solidifying material on a base member in a desired pattern, comprising:

a moveable dispensing head having an elongated material passage therein connected to a dispensing outlet at one end thereof, and having an oppositely disposed material receiving end;

a supply of material comprising a continuous flexible strand which solidifies at a predetermined temperature, and a material advance mechanism positioned to advance the strand into the elongated material passage on the head;

a base member disposed in close, working proximity to said dispensing outlet of said dispensing head;

mechanical means for moving said dispensing head and said base member relative to each other in multiple dimensions in a predetermined sequence and pattern;

means for metering the discharge of said material in a fluid state from said dispensing outlet at a predetermined rate onto said base member to form a three-dimensional object as said dispensing head and base member are moved relative to each other;

heating means in heat exchange relation to said dispensing head for heating said strand material to a temperature above its solidification temperature in said material passage wherein said material is in a fluid state; and a substrate positioned on said base member to receive material in a fluid state from said dispensing outlet, said substrate comprising a foam plastic material of open cellular construction.

* * * * *